US006772993B1

(12) United States Patent
Miller et al.

(10) Patent No.: US 6,772,993 B1
(45) Date of Patent: Aug. 10, 2004

(54) PLUG AND SEAL ASSEMBLY

(75) Inventors: Stanley F. Miller, Orange, CA (US); Curtis George Sterud, Garden Grove, CA (US)

(73) Assignee: Control Components, Inc., Rancho Santa Margarita, CA (US)

( * ) Notice: Subject to any disclaimer, the term of this patent is extended or adjusted under 35 U.S.C. 154(b) by 39 days.

(21) Appl. No.: 10/368,198

(22) Filed: Feb. 18, 2003

(51) Int. Cl.[7] .............................. F16K 1/44; F16K 1/46
(52) U.S. Cl. ...................................... 251/363; 251/333
(58) Field of Search ....................... 251/120, 318–334, 251/350–365

(56) References Cited

U.S. PATENT DOCUMENTS

| | | | | |
|---|---|---|---|---|
| 3,742,976 A | * | 7/1973 | Bailey | 137/516.29 |
| 4,163,544 A | * | 8/1979 | Fowler et al. | 251/328 |
| 4,878,651 A | * | 11/1989 | Meyer, Jr. | 251/172 |
| 6,641,112 B2 | * | 11/2003 | Antoff et al. | 251/363 |

* cited by examiner

Primary Examiner—Paul J. Hirsch
(74) Attorney, Agent, or Firm—Stetina Brunda Garred & Brucker

(57) ABSTRACT

Disclosed is a plug and seal assembly comprising an annular seat ring and a plug head for use in a fluid control valve utilized for regulating a flow of high-pressure fluid. The seat ring includes first, second, and third sealing discs alternately stacked with respective first, second and third resilient bearing discs. The inner annular edges of the first, second and third sealing and bearing discs collectively define a conical sealing surface. The plug head defines stepped first, second and third ramps, each ramp having a truncated conical shape of equal half-angle with the conical sealing surface half-angle being larger than the ramp half-angle. The direct engagement of the first, second and third ramps against respective ones of the sealing discs acts to deform the respective ones of the bearing discs to create three fluid-tight seals therebetween to reduce the risk of leakage of the valve when in a closed position.

21 Claims, 5 Drawing Sheets

PLUG AND SEAL ASSEMBLY

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention relates generally to valves and, more particularly, to a uniquely configured plug and seal assembly which is specifically configured to mitigate the erosive and cavitating effects of flashing water and steam flowing within a fluid control valve.

In power plants, boiler water is typically circulated within a closed loop by a feedpump. The feedpump takes the water from a deaerator and increases the pressure from ambient up to 6000 psi for delivery to a boiler. Because the feedpump operates at a relatively constant rotational speed, a minimum amount of flow through the feedpump is required in order to avoid overheating and cavitation of the feedpump components. However, the boiler feed flow requirements fluctuate regularly throughout the day in proportion to changing electricity production demands placed upon the power plant. When the boiler feed flow requirements are reduced to a level below the minimum required flow through the feedpump necessary to avoid overheating and cavitation of the feedpump, a recirculation system is engaged to direct a portion of the high pressure flow back to the deaerator or to a condenser and then to the feedpump. Ideally, the recirculation system will meter the flow in response to the feedpump requirements such that an optimal flow level is circulated through the feedpump in order to prevent excessively high feedpump operating temperatures and to prevent cavitation of the internal feedpump components.

A recirculation valve is typically utilized in the recirculation system to selectively block and unblock the flow of high pressure water to the deaerator or condenser. The recirculation valve may be configured as a linear displacement valve. Such recirculation valves include plugs that are linearly displaced during normal operation of the valve. Within these valves, the plug is axially slidable within a valve cage. The valve cage defines a multiplicity of tortuous or non-tortuous fluid passageways. Certain linear displacement valves are configured for "over plug flow" wherein water flows radially inward into the interior of the valve cage from the exterior thereof, with the water undergoing a pressure drop as a result of the flow through the valve cage. To open the valve, the plug is lifted off of a seat ring which then allows fluid, such as boiler water, to flow from the interior of the valve cage and out of the valve via the unblocked seat ring. Conversely, the movement of the seating surface of the plug into sealed engagement with the complementary seating surface of the seat ring facilitates a closed or shut-off condition for the recirculation valve.

The recirculation valve must be capable of handling water at extreme thermodynamic conditions. For example, within the interior chamber of the valve, the water pressure may range from 2500 to 6000 psig and the temperature may be at 300° F. to 500° F. At the outlet of the valve, the pressure of the water may range from only −12 to 10 psig with corresponding temperatures of only 110° F. to 240° F. Thus, in the open position, the plug and seal of the recirculation valve must be capable of withstanding an extreme pressure drop under flashing conditions while simultaneously minimizing erosion and cavitation of the seating surfaces of the plug and seat ring. Cavitation causes "pitting" of the metallic surface of the valve plug and seal that may occur during the sudden extreme pressure drop of the passing boiler water. The "pitting" of the plug and seal may result in leak paths that may increase in size over time due to erosion. As distinguished from normal evaporation, flashing is the sudden vaporization of the water caused by an instantaneous temperature and/or pressure drop.

In recirculation valves such as those that are utilized in power plants, the fluid flowing from valve inlet to outlet may undergo a pressure drop of up to 5500 psig at a temperature of up to 500° F. Such a pressure drop of the boiler water may be characterized as a violently explosive event occurring within the valve. In addition, in the closed position, the valve seat and plug must be capable of blocking flow with no leakage against pressures as high as 6000 psig. Should even a slight amount of leakage occur, flashing steam and water will cut and erode the seating surface of the metallic valve seat and plug with the effectiveness of a saw blade, quickly increasing the leakage path and rendering the valve useless. The constant leakage of the flashing steam and water will further accelerate the erosion damage of the seat ring and the plug. As mentioned above, during periods of high electricity production demands upon the power plant, the boiler feed flow requirements are at a maximum. Excessive leakage in the recirculation valve may prevent the required flow of water from reaching the boiler resulting in the failure of the power plant to meet the electricity demands that may be placed upon it. In extreme cases, excessive leakage of a recirculation valve may necessitate that the power plant be taken off line in order to replace the leaking valve.

The present invention specifically addresses the above-described erosion and cavitation damage problem by providing a plug and seal assembly with unique, complementary configurations specifically adapted to prevent the water exiting the valve cage from directly impinging the seating surface of the seat ring. The present invention alternatively provides a plug and seal assembly having a redundancy of sealing surfaces in order to reduce the risk of leakage. In this regard, the present invention provides a plug and seal assembly capable of neutralizing the erosion of the seating surfaces due to flashing and cavitation. These, and other features of the present invention, will be described below.

BRIEF SUMMARY OF THE INVENTION

The plug and seal assembly of the present invention is adapted for use in a fluid control valve. The fluid control valve includes a valve housing defining an interior chamber and a flow opening configured to fluidly communicate with the interior chamber. The interior chamber receives the fluid therein and the flow opening allows the fluid to escape the interior chamber. In a first embodiment, the plug and seal assembly comprises an annular seat ring and a generally cylindrical plug. The seat ring is at least partially engaged to the valve housing at the flow opening.

The valve housing may also include a sleeve and a valve cage concentrically disposed within the interior chamber. The valve cage is captured between the sleeve and the seat ring. The valve cage defines annular flow passages configured for reducing the pressure of the fluid flowing therethrough from the interior chamber prior to exiting the flow opening. The sleeve has an elongate bore extending axially therethrough. The plug and seal assembly includes the plug.

The plug is comprised of a plug body and a plug head. Extending axially from one end of the plug body is a rod which is advanced through the bore within the sleeve of the valve housing. The rod is coupled to an actuator which reciprocally moves the valve plug between a closed position and an open position. The engagement of the plug to the seating surface defined by the seat ring effectively blocks the flow of fluid out of the interior of the valve cage. Fluid flows into the interior chamber and thereafter radially through the valve cage from the exterior to the interior thereof. When the valve plug is moved from its closed position towards its open position, fluid is able to flow downwardly through the seat ring and out of the fluid control valve. The plug head may comprise a plug head of a first embodiment or a plug head of a second embodiment. Likewise, the seat ring may comprise a seat ring of the first embodiment or a seat ring of the second embodiment. The plug head and seat ring of the first embodiment are configured for use in conjunction with each other as are the plug head and seat ring of the second embodiment.

The seat ring of the first embodiment includes first, second, and third sealing discs alternately stacked with respective first, second and third resilient bearing discs. The bearing discs may be formed of an elastomeric material having high resilience such as carbon-fiber/nitrile sheets. The sealing discs may be formed of a metallic material such as stainless steel. The sealing discs provide support for the bearing discs which, unaided by the sealing discs, are incapable of withstanding the rapid expansion of the fluid as it flows along the plug and seat ring and out of the flow opening. The inner annular edges of the first, second and third sealing and bearing discs collectively define a truncated conical sealing surface of a predetermined half-angle. The plug head defines an upper cylindrical section and stepped first, second and third ramps. Each of the first, second and third ramps has a truncated conical shape of equal half-angle. The first, second and third ramps define respective first, second and third shoulders adjacent the major diameters of the ramps. The half-angle of the conical sealing surface is larger than the half-angle of the first, second and third ramps. The direct engagement of the first, second and third shoulders against respective first, second and third sealing discs acts to deform the respective first, second and third bearing to create three fluid-tight seals therebetween. Thus, the configuration of the plug and seal assembly of the first embodiment creates a redundancy of sealing surfaces in order to reduce the risk of leakage of fluid out of the fluid control valve when in the closed position.

The second embodiment of the plug and seal assembly includes a seat ring having first, second, and third sealing plates alternately stacked with respective first, second and third resilient bearing plates. The inner edge of the first sealing plate defines a first cylindrical surface. The first and second bearing plates and the second sealing plate collectively define a second cylindrical surface of a diameter larger than that of the first cylindrical surface. The third sealing and bearing plates and the upper portion of the seat ring collectively define a truncated conical sealing surface having a predetermined half-angle and a major diameter equal to that of the second cylindrical surface. The bearing plates may be formed of an elastomeric material such as carbon-fiber/nitrile sheets. The sealing plates may he formed of a metallic material such as stainless steel.

The plug head of the second embodiment successively defines an upper barrel, a first taper, an intermediate cylindrical barrel and a second taper. The first taper is interposed between the upper and intermediate barrels with the second taper interposed below the intermediate barrel. The half-angle of the second taper is substantially equal to the half-angle of the conical sealing surface. The diameter of the upper cylindrical barrel is smaller than that of the first sealing plate and larger than that of the second bearing plate. By arranging the plug and seat ring in this manner, the engagement of the first taper to the first bearing plate deforms the second bearing plate to create a seal therebetween. Simultaneously, a surface-to-surface seal is created between the second taper and the conical sealing surface collectively formed by the third sealing and bearing plates and the seat ring.

BRIEF DESCRIPTION OF THE DRAWINGS

These, as well as other features of the present invention, will become more apparent upon reference to the drawings wherein.

DETAILED DESCRIPTION OF THE INVENTION

Figure 1:
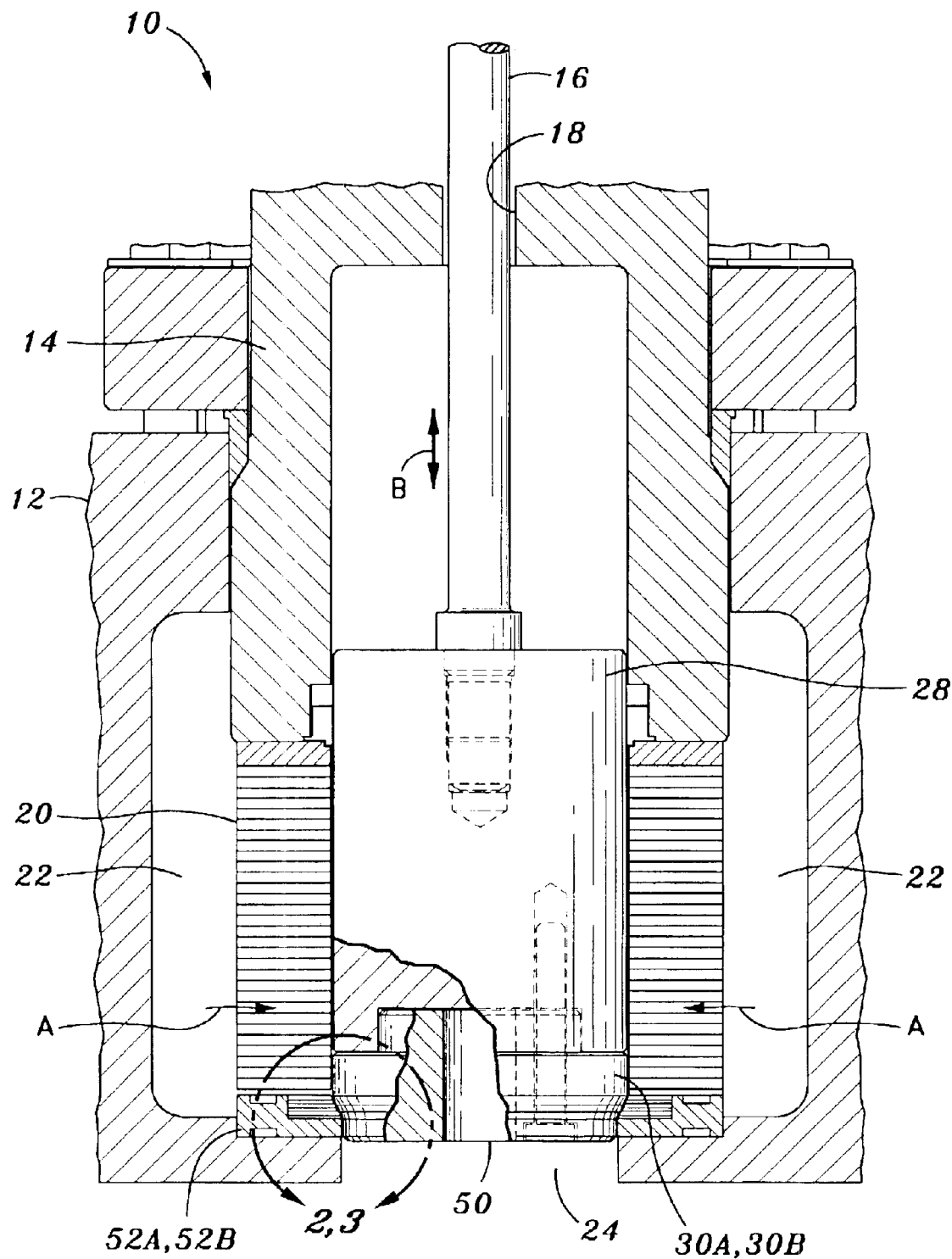
FIG. 1 is a partial cross-sectional view of a fluid control valve including a plug and seal assembly constructed in accordance with either a first embodiment or a second embodiment of the present invention.

Referring now to the drawings wherein the showings are for purposes of illustrating preferred embodiments of the present invention only, and not for purposes of limiting the same, FIG. 1 is a partial cross-sectional view of a fluid control valve 10. The fluid control valve 10 includes a valve housing 12 defining an interior chamber 22 and a flow opening 24. The flow opening 24 is configured to fluidly communicate with the interior chamber 22. The interior chamber 22 receives the fluid therein and the flow opening 24 allows the fluid to escape the interior chamber 22. The plug and seal assembly constructed in accordance with the present invention comprises a seat ring and a plug. The plug may include a plug body 28 and a plug head, each of which may be of a generally cylindrical configuration. The plug head may be affixed to the plug body 28. As will be discussed in more detail below, the plug head may comprise a plug head 30A of the first embodiment shown in FIGS. 2A, 2B and 2C, or a plug head 308 of the second embodiment shown in FIGS. 3A, 3B and 3C. Likewise, the seat ring may comprise either a seat ring 52A of the first embodiment shown in FIGS. 2A, 2B and 2C, or a seat ring 52B of the second embodiment shown in FIGS. 3A, 3B and 3C.

The valve housing 12 may include an annular sleeve 14 and an annular valve cage 20 concentrically disposed within the interior chamber 22. The valve cage 20 is captured between the sleeve 14 and the seat ring. The sleeve 14 has the bore 18 extending axially therethrough. The valve cage 20 defines annular flow passages that may be tortuous or non-tortuous. The fluid passageways may be configured for reducing the pressure of the fluid flowing therethrough from the interior chamber 22 prior to exiting the flow opening 24. A gasket 56 is interposed between the valve cage 20 and the seat ring for maintaining a fluid tight seal between the valve cage 20 and the seat ring. The gasket 56 may be formed of an elastomeric material capable of withstanding the extreme temperature and pressures of the fluid exiting the valve cage 20. In this regard, the elastomeric material may comprise carbon-fiber/nitrile sheets. It is contemplated that the gasket 56 may be formed of TEFLON. Attached to the plug body 28 and extending axially from one end thereof is an elongate shaft or rod 16 which is advanced through the bore 18 within the sleeve 14 of the valve housing 12. The rod 16 is coupled to an actuator (not shown) which is operative to reciprocally move the valve plug between a closed position (shown in FIG. 2B) and an open position (shown in FIG. 2A) in alternate directions as indicated by the arrow B.

The actuator may be a piston actuator, and may alternatively comprise any type of actuator (e.g., air diaphragm, electric, hydraulic). Movement of the valve plug to the open position occurs as a result of the movement of the rod 16 in alternate directions shown by the arrow B in FIGS. 1 and 2A. As will be recognized, upon the movement of the valve plug to its open position, the same may be selectively returned to its closed position by the movement of the rod 16 in an opposite direction. The engagement of the plug to the seating surface defined by the seat ring effectively blocks the flow of fluid out of the interior of the valve cage 20. As indicated above, in the over plug flow arrangement, fluid flows into the interior chamber 22 and thereafter radially through the valve cage 20 from the exterior to the interior thereof. The fluid flowing into the interior of the valve cage 20 undergoes a pressure drop as a result of the flow through the tortuous fluid passageways defined by the valve cage 20. When the valve plug is moved from its closed position towards its open position, fluid is able to flow downwardly through the seat ring and out of the fluid control valve 10.

The plug head may be attached to the plug body 28 by means of bolts or the like such that the plug head may be removed from the plug body 28 and replaced with a plug head of the same configuration or of a different configuration. Thus, it is contemplated that the plug head may be interchangeable. The plug head is axially slidable within the interior chamber 22. As will be discussed in more detail below, the plug head 30A and seat ring 52A of the first embodiment are configured for use in conjunction with each other. Similarly, the plug head 30B and seat ring 52B of the second embodiment are configured for use in conjunction with each other. As shown in FIG. 1, the end of the plug head opposite that including the rod 16 extending therefrom is configured to engage the seat ring in a closed position.

Figure 2A:
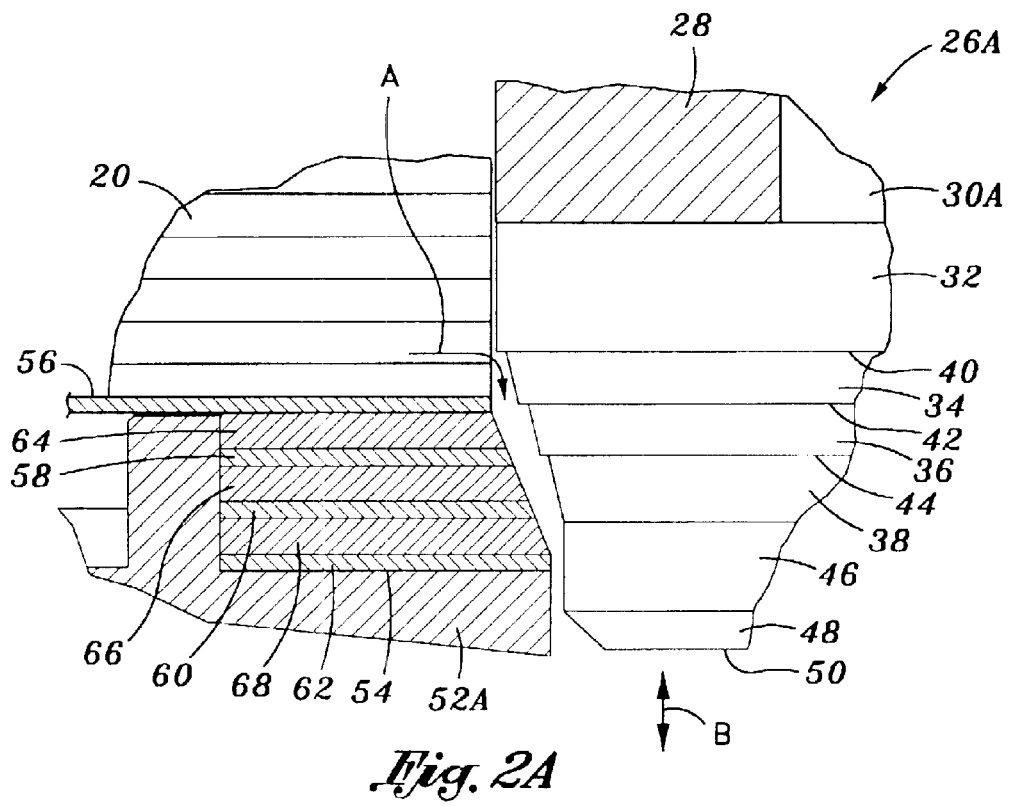
FIG. 2A is an enlarged partial cross-sectional view of the encircled region 2—2, of FIG. 1, showing the fluid control valve in an open position with the plug head and seat ring of the first embodiment.
Figure 2B:
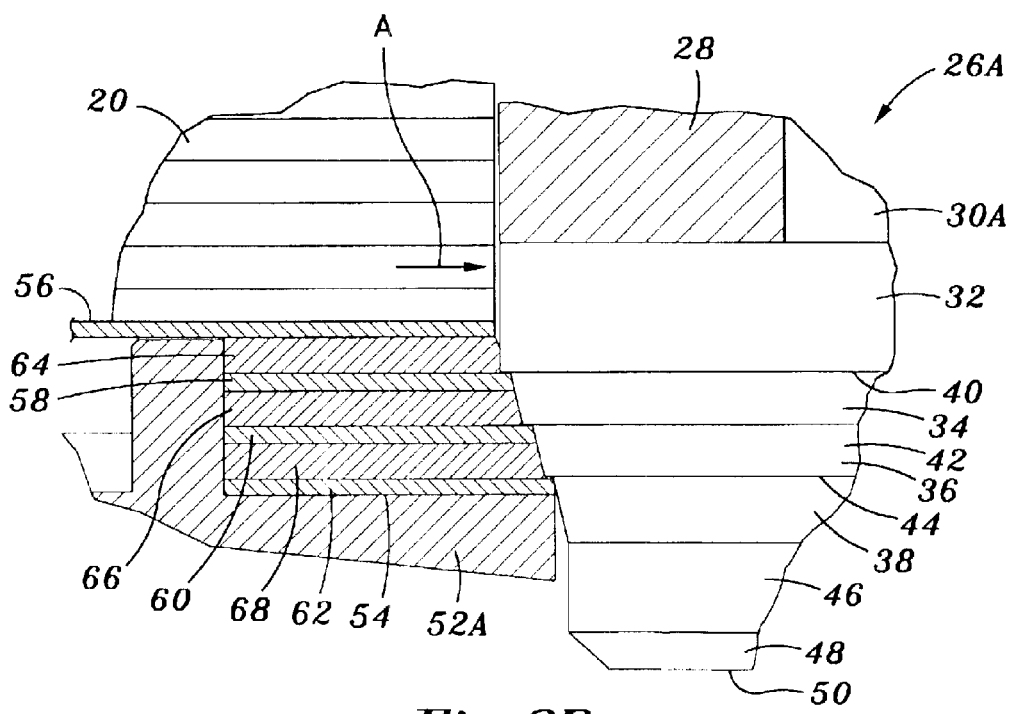
FIG. 2B is a partial cross-sectional view similar to FIG. 2A, showing the fluid control valve in a closed position with the plug head and seat ring of the first embodiment.
Figure 2C:
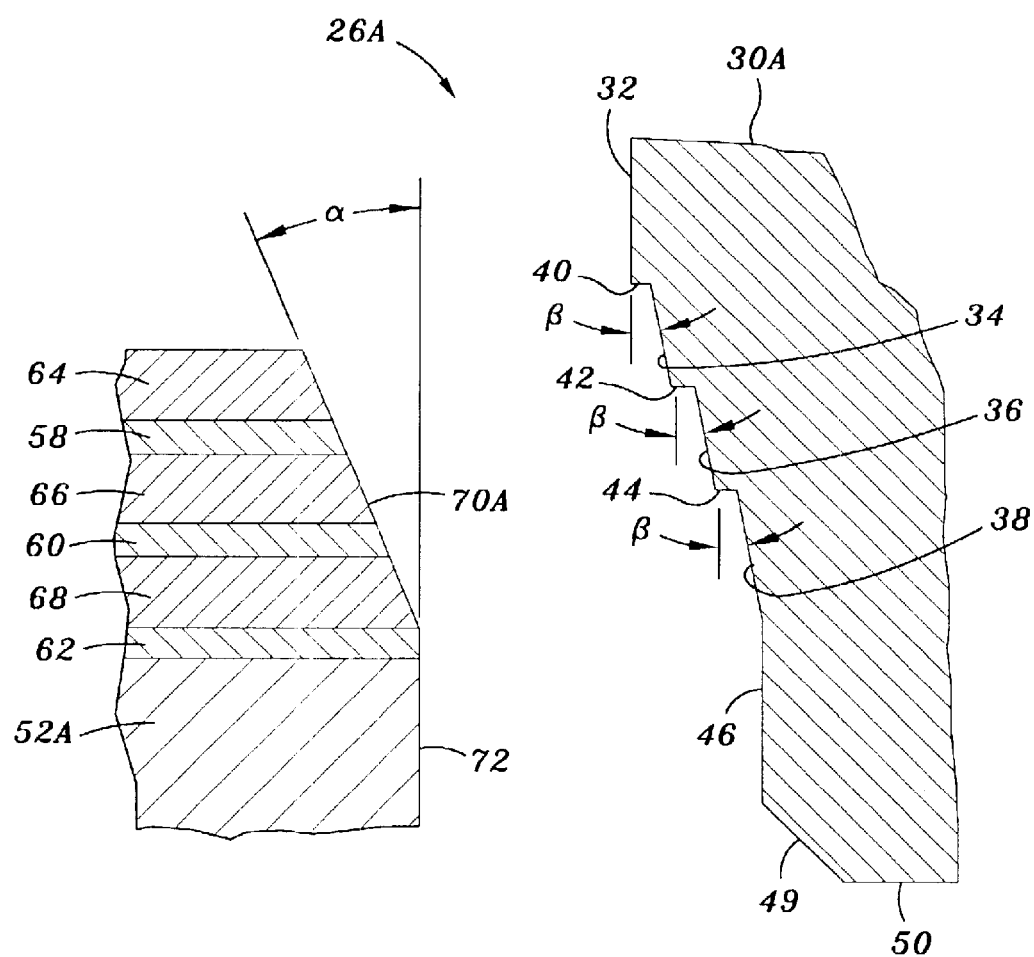
FIG. 2C is an exploded partial cross-sectional view illustrating in detail the features of the plug head and seat ring of the first embodiment.

Turning now to FIGS. 2A, 2B and 2C, shown is the plug and seal assembly 26A of the first embodiment of the present invention illustrating the features of the plug head 30A and seat ring 52A. The seat ring 52A may be of a generally annular configuration and may be at least partially engaged to the valve housing 12 at the flow opening 24. The seat ring 52A further defines an inner cylindrical surface 72 and a vertical axis. As can be seen in FIG. 2C, the seat ring 52A includes first, second, and third sealing discs 64, 66, 68 alternately stacked with respective first, second and third resilient bearing discs 58, 60, 62. The first sealing disc 64 is disposed immediately adjacent and above the first bearing disc 58. The second sealing disc 66 is disposed immediately adjacent and above the second bearing disc 60, with the third sealing disc 68 being disposed immediately adjacent and above the third bearing disc 62.

The sealing discs 64, 66, 68 may be formed of a metallic material such as stainless steel. The sealing discs 64, 66, 68 are permanently deformed or coined during initial engagement of the plug head 30A with the scat ring 52A. During the coining, the sealing discs 64, 66, 68 are impressed with the imprint of the plug head 30A. The resiliency of the first, second and third bearing discs 58, 60, 62 allows the first, second and third sealing discs 64, 66, 68 to be uniformly loaded by the plug head 30A. Thus, it is desirable that the sealing discs 64, 66, 68 are of a thin cross-section. Additionally, the sealing discs 64, 66, 68 must be capable of withstanding the sudden and violent expansion of the fluid as it flows through the flow opening 24 during the disengagement of the plug head 30A from the seat ring 52A. As mentioned above, the fluid flowing from the valve cage 20 is at an extremely high pressure while the area below the plug head 30A is in a low pressure condition. When the plug head 30A is disengaged from the seat ring 52A, the fluid flows through the flow opening 24 and rapidly expands. The sealing discs 64, 66, 68 provide support for the bearing discs 58, 60, 62 which, unaided by the sealing discs 64, 66, 68, are incapable of withstanding the rapid expansion of the fluid as it flows along the plug head 30A and seat ring 52A. Stainless steel is a preferred material for the sealing discs 64, 66, 68 because of the enhanced resistance of stainless steel to corrosion and cavitation as compared to other metals.

The bearing discs 58, 60, 62 may he formed of an elastomeric material having high resilience. The elastomeric material may be carbon-fiber/nitrile sheets. The nitrile compounds provide the bearing discs 58, 60, 62 with a flexible character such that the bearing discs 58, 60, 62 may be initially deformed or coined by the plug head 30A when the valve is in the closed position. The resiliency of the bearing discs 58, 60, 62 allows the sealing discs 64, 66, 68 to be uniformly loaded by the plug head 30A. The carbon-fiber compounds provide the bearing discs 58, 60, 62 with sufficient strength and tear resistance to repeatedly withstand extreme and sudden pressure drops such as those that may occur in a recirculation valve of a power plant. In addition, the carbon-fiber/nitrile material is capable of retaining its strength characteristics at the temperatures associated with recirculation valves. TEFLON may be suitable as a material for the bearing discs 58, 60, 62.

Referring now more particularly to FIG. 2C, the inner annular edges of the first, second and third sealing discs 64, 66, 68 and the first and second bearing discs 58, 60 collectively define a truncated conical sealing surface 70A having a predetermined half-angle with a vertical axis of the plug and seal assembly 26A. The seat ring 52A may further define a ring bore 54 positioned concentrically with the flow opening 24 of the valve housing 12. The sealing and bearing discs 64, 66, 68, 58, 60, 62 may be configured with a circular outer shape for nesting in abutting contact within the inner diameter of the ring bore 54. As can be seen in FIG. 2C, the plug head 30A defines an upper cylindrical section 32 and stepped first, second and third ramps 34, 36, 38. The first ramp 34 is disposed below and abuts the upper cylindrical section 32. Each of the first, second and third ramps 34, 36, 38 has a truncated conical shape of equal half-angle. As will be discussed in more detail below, the upper cylindrical section 32 and the ramps 34, 36, 38 are sized and configured such that direct engagement thereof against the sealing and bearing discs 64. 66, 68, 58, 60, 62 creates three fluid-tight seals for blocking the flow of fluid out of the interior chamber 22. The half-angle of the conical sealing surface 70A collectively defined by the first, second and third sealing discs 64, 66, 68 and the first and second bearing discs 58, 60 is indicated in FIG. 2C as α. The half-angle of the first, second and third ramps 34, 36, 38 is indicated as β. Although not mandatory, it is contemplated that the half-angle α of conical sealing surface 70A as measured relative to the vertical axis may be larger than the half-angle β of the first, second and third ramps 34, 36, 38.

The upper cylindrical section 32 may have a diameter larger than the major diameter of the abutting first ramp 34 so as to define a first shoulder 40 therebetween. The first ramp 34 minor diameter may be larger than the second ramp 36 major diameter so as to define a second shoulder 42 therebetween. The second ramp 36 minor diameter may be larger than the third ramp 38 major diameter so as to define a third shoulder 44 therebetween. The height of the first ramp 34 may be configured to be substantially equivalent to the combined thickness of the first bearing disc 58 and the second sealing disc 66. The height of the second ramp 36 may be configured to be substantially equivalent to the combined height of the second bearing disc 60 and the third sealing disc 68. A preferred half-angle α of the conical sealing surface 70A for the first embodiment is twenty-two degrees while the preferred half-angle β of each of the first, second and third ramps 34, 36, 38 is eleven degrees. As mentioned above, the half-angle is measured relative to the vertical axis of the plug and seal assembly 26A.

It will be appreciated that the conical sealing surface 70A and the first, second and third ramps 34, 36, 38 may be configured with alternate angles depending on operational requirements. By configuring the seat ring 52A and plug such that the half-angle α is larger than the half-angle β, the direct engagement of the first, second and third shoulders 40, 42, 44 against respective first, second and third sealing disc 64, 66, 68 acts to deform the respective first, second and third bearing discs 58, 60, 62 to create three fluid-tight seals therebetween. Thus, the configuration of the plug and seal assembly 26A of the first embodiment creates a redundancy of sealing surfaces in order to reduce the risk of leakage of fluid out of the fluid control valve 10 when in the closed position as shown in FIG. 2B.

Referring to FIG. 2C, the plug head 30A may further include a lower cylindrical section 46 abutting the third ramp 38. The diameter of the lower cylindrical section 46 is smaller than that of the inner cylindrical surface 72 collectively defined by the seat ring 52A and third bearing disc 62 such that an annular gap is created therebetween. As mentioned above, in recirculation valves such as those that are utilized in power plants, the pressure drop across the flow opening 24 may be as much as 5500 psig at a temperature of up to 500° F. Such a rapid pressure drop of the boiler water may be characterized as explosive in nature as the highly pressurized boiler water expands into an area of ambient pressure and temperature. The lower cylindrical section 46 may be configured such that the expansion of the flow of fluid flowing out of the flow opening 24 is restricted within the area of the annular gap defined by the inner cylindrical surface 72 of the seat ring 52A and the lower cylindrical section 46. By restricting the flow of the fluid through the confines of the annular gap, the rate of expansion of the fluid as it passes through the flow opening 24 may be controlled. In this regard, the lower cylindrical section 46 is effective to control the rate of the pressure drop of the fluid as the plug head 30A is disengaged from the seat ring 52A and the valve is opened allowing the highly-pressurized fluid to enter the area of low pressure. Thus, the lower cylindrical section 46 prevents damage to the resilient bearing discs 58, 60, 62 during the initial disengagement of the plug head 30A from the seat ring 52A due to the extreme pressure and temperature drop of the boiler water across the flow opening 24. As can be seen in FIGS. 2A and 2B, the plug head 30A further defines an end face 50 adjacent the lower cylindrical section 46. The edge between the end face 50 and the lower cylindrical section 46 may include a bevel 48 for providing a smooth flow path for the fluid exiting the flow opening 24. The bevel 48 may minimize the creation of flow turbulence in the fluid which further reduces the cavitating and erosive effects of the fluid upon the plug head 30A and seat ring 52A.

Figure 3A:
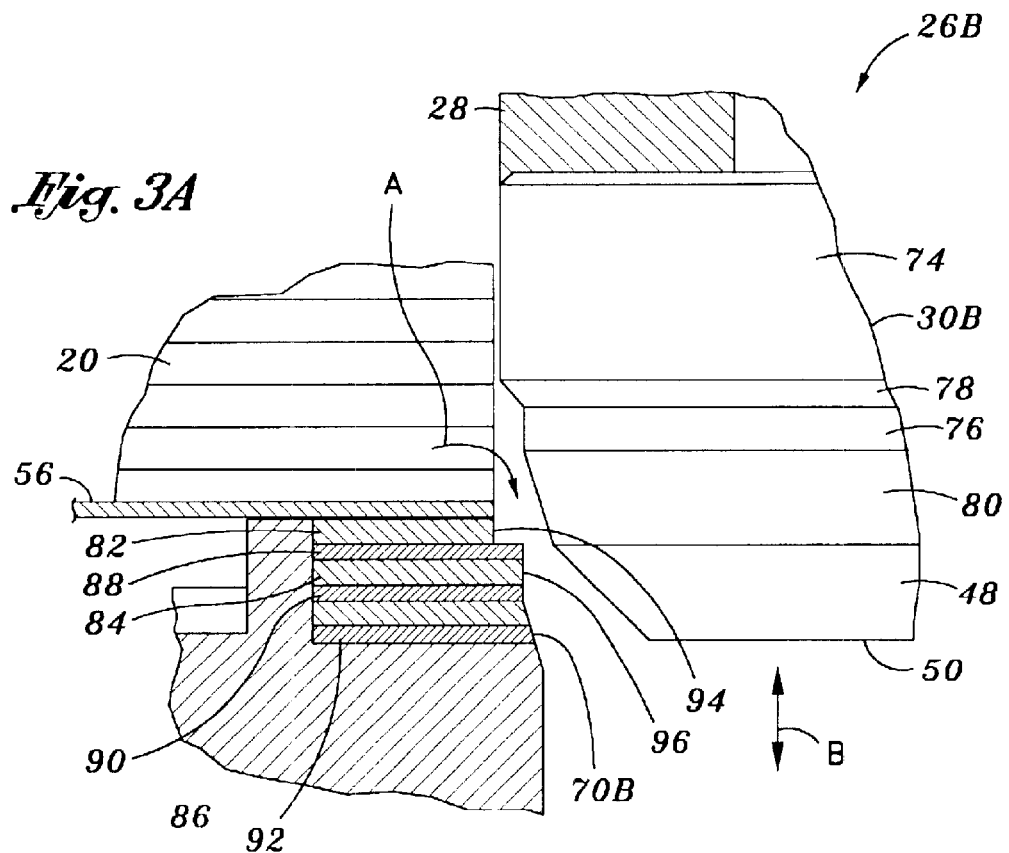
FIG. 3A is an enlarged partial cross-sectional view of the encircled region 3—3, of FIG. 1, showing the fluid control valve in an open position with the plug head and seat ring of the second embodiment.
Figure 3B:
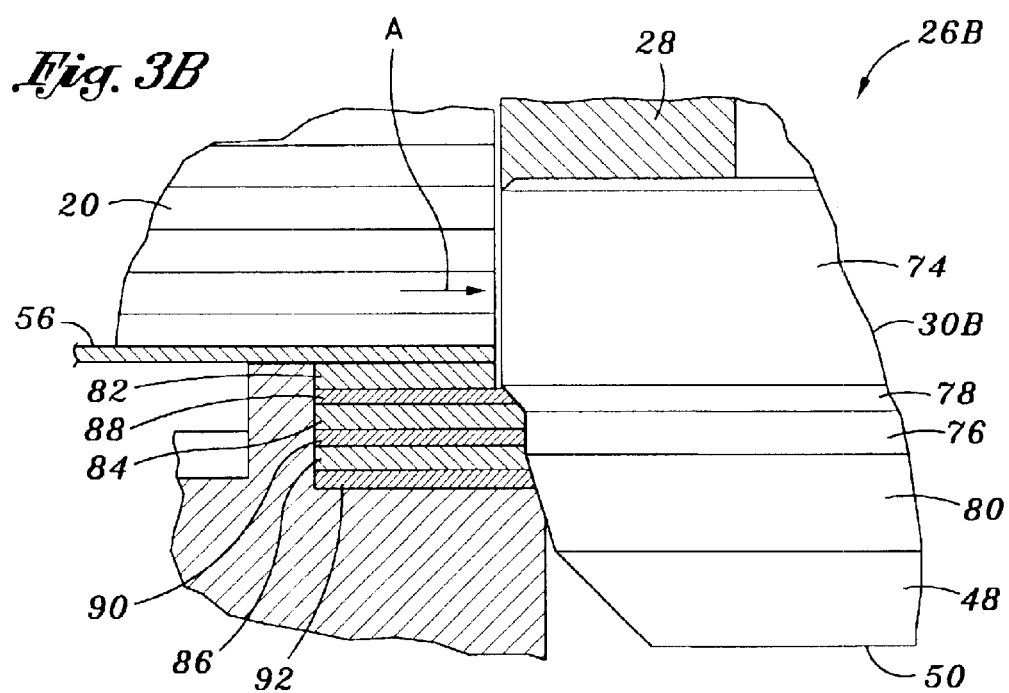
FIG. 3B is a partial cross-sectional view similar to FIG. 3A, showing the fluid control valve in a closed position with the plug head and seat ring of the second embodiment.
Figure 3C:
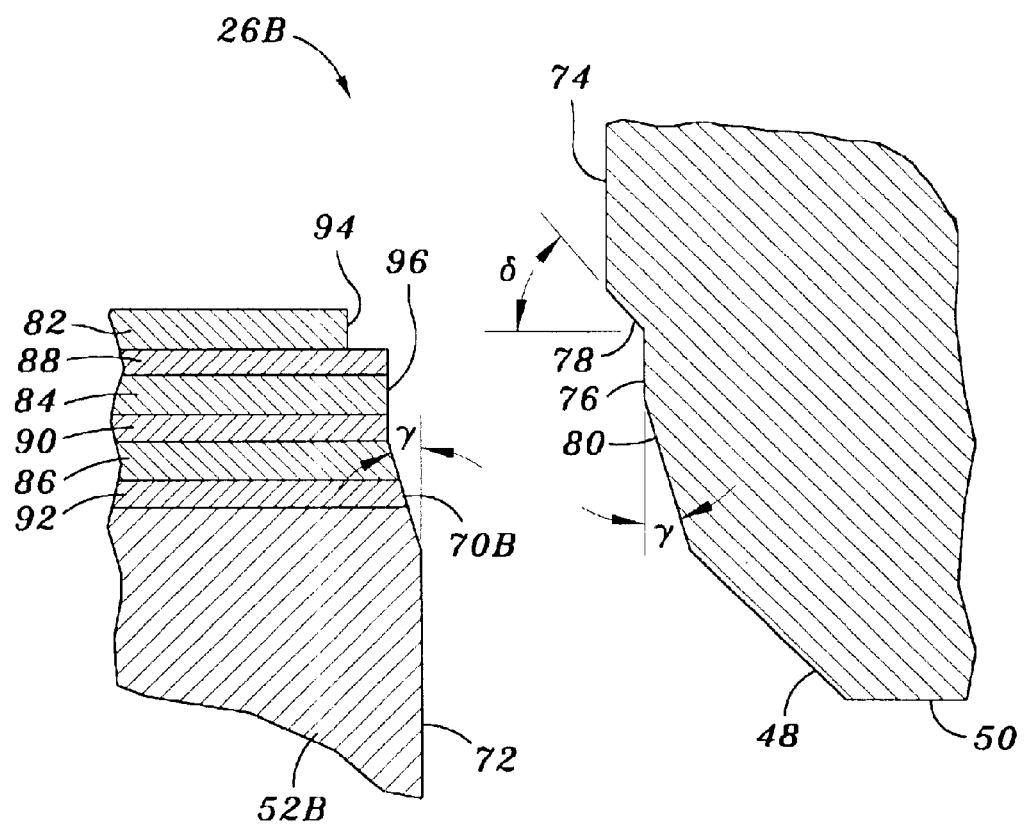
FIG. 3C is an exploded partial cross-sectional view illustrating in detail the features of the plug head and seat ring of the second embodiment.

Turning now to FIGS. 3A, 3B and 3C, shown is the second embodiment of the plug and seal assembly 26B of the present invention, which includes the plug head 30B and seat ring 52B. As in the plug and seal assembly 26A of the first embodiment, the plug and seal assembly 26B of the second embodiment is used in the fluid control valve 10 having the valve housing 12. The valve housing 12 defines the interior chamber 22 and the flow opening 24 therein. The interior chamber 22 receives the fluid and the flow opening 24 allows the fluid to escape the interior chamber 22. The plug and seal assembly 26B includes the cylindrical plug body 28 and is comprised of the seat ring 52B engaged to the valve housing 12 at the flow opening 24. As can be seen in FIG. 3C, the seat ring 52B of the second embodiment includes first, second, and third sealing plates 82, 84, 86 alternately stacked with respective first, second and third resilient bearing plates 88, 90, 92. Similar to the arrangement of the sealing and bearing discs 58, 60, 62, 64, 66, 68 of the first embodiment shown in FIG. 2C, the first sealing plate 82 is disposed above the first bearing plate 88, the second sealing plate 84 is disposed above the second bearing plate 90 and the third sealing plate 86 is disposed above the third bearing plate 92 as shown in FIG. 3C.

The inner edge of the first sealing plate 82 defines a first cylindrical surface 94. The first and second bearing plates 88, 90 and the second sealing plate 84 collectively define a second cylindrical surface 96 of a diameter smaller than that of the first cylindrical surface 94. The third sealing and bearing plates 86, 92 and the upper portion of the seat ring 52B collectively define a truncated conical sealing surface 70B having a major diameter equal to that of the second cylindrical surface 96. It is contemplated that the bearing plates 88, 90, 92 may be formed of an elastomeric material having high resilience. The elastomeric material may be carbon-fiber/nitrile sheets which have high strength characteristics imparted by the carbon-fiber compounds and high flexibility characteristics imparted by the nitrile compounds. The sealing plates 82, 84, 86 may be formed of a metallic material such as stainless steel which may be selected because of its corrosion and cavitation resistance. Like the sealing and bearing discs 58, 60, 62, 64, 66, 68 of the first embodiment, the sealing and bearing plates 82, 84, 86, 88, 90, 92 may be configured with a circular outer perimeter complementary to the inner diameter of the ring bore 54 such that the sealing and bearing plates 82, 84, 86, 88, 90, 92 may nest in abutting contact within the inner diameter of the ring bore 54. In addition, the valve housing 12 may include the sleeve 14 and valve cage 20 concentrically disposed within the interior chamber 22. The valve cage 20 is captured between the sleeve 14 and the seat ring 52B. The valve cage 20 is configured for reducing the pressure of the fluid flowing therethrough from the interior chamber 22 prior to exiting the flow opening 24. The gasket 56 interposed between the valve cage 20 and the seat ring 52B maintains a fluid tight seal therebetween.

The cylindrical plug head 30B of the second embodiment is axially slidable within the interior chamber 22 and is affixed to the plug body 28. The plug head 30B defines a first taper 78 and a second taper 80 disposed below and abutting the first taper 78. The first and second tapers 78, 80 are sized and configured such that the direct engagement of the first taper 78 to the first bearing plate 88 creates a fluid-tight edge-to-surface seal. Simultaneously, the second taper 80 directly engages the conical sealing surface 70B creating a fluid-tight surface-to-surface seal. The edge-to-surface seal and the surface-to-surface seal collectively block the flow of fluid out of the interior chamber 22. The plug head 30B may further define an upper cylindrical barrel 74 which is sized such that an annular gap is created between the upper barrel 74 and the first cylindrical surface 94 during direct engagement of the first taper 78 to the first bearing plate 88. The plug head 30B may also define an intermediate cylindrical barrel 76 disposed between the first taper 78 and the second taper 80 and having a diameter substantially equal to that of the second cylindrical surface 96.

The plug head 30B of the second embodiment may also define the end face 50 disposed adjacent to the second taper 80 and normal to the vertical axis of the plug and seal assembly 26B. The edge between the end face 50 and the second taper 80 may include the bevel 48 for providing a smooth path for the fluid flowing out of the flow opening 24 such that the cavitation and erosive effects of the fluid upon the plug and seat ring 52B may be minimized. The first taper 78 is disposed between the upper and intermediate barrels 74, 76, with the second taper 80 being disposed below the intermediate barrel 76. The diameter of the upper barrel 74 is smaller than that of the first sealing plate 82 and larger than that of the second bearing plate 90. The engagement of the first taper 78 to the first bearing plate 88 deforms the second bearing plate 90 to create a seal therebetween. Simultaneously, a surface-to-surface seal is created between the second taper 80 and the conical sealing surface 70B collectively formed by the third sealing and bearing plates 86, 92 and the seat ring 52B. Due to its greater amount of contact area, the surface-to-surface seal created between the second taper 80 and the conical sealing surface 70B forms the primary seal for the plug and seal assembly 26B of the second embodiment, while the edge-to-surface seal created between the first taper 78 and the first bearing plate 88 forms a secondary seal. The metal-to-metal contact areas formed between the first taper 78 and the second sealing plate 84, between the upper portion of the second taper 80 and the third sealing plate 86, and between the lower portion of the second taper 80 and the upper portion of the seat ring 52B also helps to seal the plug head 30B against the seat ring 52B and supports the compressive load of the plug head 3GB against the seat ring 52B when the fluid control valve 10 is in the closed position as shown in FIG. 3B.

Referring now to FIG. 3C, shown is an exploded partial cross-sectional view of a portion of the plug head 30B and the seat ring 52B illustrating in detail the features thereof. As can be seen, the half-angle of the truncated conical sealing surface 70B collectively defined by the third sealing and bearing plates 86, 92 and the seat ring 52B is indicated as $\gamma$. The half-angle of the second taper 80 is also indicated as $\gamma$. Although not mandatory, it is contemplated that the half-angle $\gamma$ of the second taper 80 and the complementary half-angle $\gamma$ of the conical sealing surface 70B may be substantially equal in order to create the surface-to-surface seal therebetween during engagement of the second taper 80 with the conical sealing surface 70B. If the second taper 80 and conical sealing surface 70B are configured with unequal half-angles, an edge-to-surface seal may be created upon engagement of the second taper 80 with conical sealing surface 70B. Although configurable in any half-angle, a preferred half-angle $\gamma$ for the conical sealing surface 70B and the second taper 80 for the second embodiment are approximately twenty degrees as is illustrated in FIG. 3C. The half-angle of the first taper 78 is indicated as $\delta$ in FIG. 3C. Although the first taper 78 may be configured in any half-angle, a preferred half-angle $\delta$ is approximately forty-five degrees as illustrated in FIG. 3C.

The operation of the first embodiment of the plug and seal assembly 26A will now be discussed. In the closed position shown in FIG. 2B, the upper cylindrical section 32, and the first and second ramps 34, 36 of the plug head 30A radially deform the respective first, second and third sealing discs 64, 66, 68 of the seat ring 52A in a metal-to-metal interference fit. At the same time, the first, second and third shoulders 40, 42, 44 bear against the respective first, second and third resilient bearing discs 64, 66, 68. Thus, direct engagement of the plug head 30A with the seat ring 52A of the first embodiment results in three successive seals providing a triple-redundant sealing configuration such that leakage in the first ramp 34 and/or second ramp 36 will be contained by the third ramp 38 while engaged to the conical sealing surface 70B. As shown in FIG. 2A, during initial disengagement of the plug head 30A from the seat ring 52A by axial movement in a direction indicated by the arrow B and effected through the use of the rod 16, the first, second and third ramps 34, 36, 38 move axially away from the conical sealing surface 70A to create a variable annular gap therebetween through which high pressure fluid may flow through the flow opening 24. As mentioned above, the lower cylindrical section 46 of the plug head 30A reduces the risk of damage to the sealing discs 64, 66, 68 that may be caused by the rapid expansion and violent phase change of the flowing fluid as the pressure thereof is reduced from up to 6000 psig down to as low as –12 psig.

The operation of the plug and seal assembly 26B of the second embodiment will now be discussed. As compared to the triple-redundant seal configuration of the plug and seal assembly 26A of the first embodiment, the plug and seal assembly 26B of the second embodiment utilizes a primary seal and a secondary seal in an alternate design approach wherein the secondary seal prevents the fluid from directly impinging the primary seal. Referring to FIG. 3B, the second embodiment features of the plug and seal assembly 26B arc illustrated in the closed position. As can be seen, the upper barrel 74 of the plug head 30B nests inside the annular area defined by the first sealing plate 82, thus creating a narrow annular gap. The first taper 78 bears against the inside edge of the first bearing plate 88. The first bearing plate 88 deforms as a result of the engagement of the first taper 78 thereupon which in turn slightly deforms the second bearing plate 90 and forms an edge-to-surface seal therebetween. The intermediate barrel 76 is of a diameter that is smaller that that defined by the first bearing plate 88 and second sealing plate 84. The second taper 80 is configured with substantially the same half-angle $\gamma$ as that of the conical sealing surface 70B such that as the plug head 30B is moved closer to the seat ring 52B, the first taper 78 will engage the first sealing plate 82 and the second bearing plate 90 until the second taper 80 contacts and seal against the conical sealing surface 70B. As noted above, in the second embodiment, the surface-to-surface seal of the second taper 80 with the conical sealing surface 70B functions as the primary seal, while the edge-to-surface seal of the first taper 78 with the first bearing plate 88 functions as the secondary seal.

As shown in FIG. 3A, upon disengaging the plug from the seal by axially moving the plug head 30B away from the seat ring 52B along a direction indicated by the arrow B, the highly pressurized fluid exiting the valve and flowing in a direction indicated by the arrow A enters the annular gap defined by the upper barrel 74 and the first sealing plate 82. The flow then deflects off of the first sealing plate 82 thereby preventing direct impingement of the fluid on the second sealing plate 84. Because the third sealing plate 86 is disposed at a steep angle relative to the vertical axis, the effects of impingement of the fluid on the third bearing plate 92 are mitigated. By configuring the second taper 80 and the conical sealing surface 70B at a steep angle relative to the vertical axis, the risks of cavitation and erosion of the plug and seal assembly 26B that may otherwise result from the violent phase change of the fluid is reduced. Thus, the second embodiment provides a plug and seal assembly 26B capable of neutralizing the erosion of the seat ring 52B and plug head 30B due to flashing and cavitation of the passing fluid.

Additional modifications and improvements of the present invention may also be apparent to those of ordinary skill in the art. Thus, the particular combination of parts described and illustrated herein is intended to represent only certain embodiments of the present invention, and is not intended to serve as a limitation of alternative devices within the spirit and scope of the invention.

What is claimed is:

1. A plug and seal assembly for a fluid control valve, the fluid control valve having a valve housing defining an interior chamber and a flow opening fluidly communicating with the interior chamber and allowing fluid to escape the interior chamber, the assembly comprising:

a seat ring engaged to the valve housing at the flow opening, the seat ring defining a vertical axis and including first, second, and third annular sealing discs disposed above respective first, second and third annular resilient bearing discs, the sealing and bearing discs collectively defining a truncated conical sealing surface having a predetermined half-angle relative the vertical axis; and a plug head axially slidable within the interior chamber and defining an upper cylindrical section and stepped first, second and third ramps, each of the ramps having a truncated conical shape of a half-angle that is less than the sealing surface half-angle, the upper cylindrical section and the ramps being sized and configured such that direct engagement thereof against the sealing and bearing discs creates three fluid-tight seals for blocking the flow of fluid out of the interior chamber.

2. The plug and seal assembly of claim 1 wherein:

the upper cylindrical section and the first ramp define a first shoulder;

the first and second ramps define a second shoulder;

the second and third ramps define a third shoulder; and the first, second and third shoulders bear against respective ones of the bearing discs when the upper cylindrical section and the first and second ramps engage the first, second and third sealing discs.

3. The plug and seal assembly of claim 1 wherein the fluid control valve further comprises a cylindrical plug body and:

the seat ring has an annular configuration;

the plug head is affixed to the plug body and has a cylindrical configuration;

the height of the first ramp is substantially equal to the combined thickness of the first bearing disc and the second sealing disc; and the height of the second ramp is substantially equal to the combined thickness of the second bearing disc and the third sealing disc.

4. The plug and valve assembly of claim 1 wherein:

the half-angle of the conical sealing surface is approximately twenty-two degrees; and the half-angle of each of the ramps is approximately eleven degrees.

5. The plug and seal assembly of claim 1 wherein:

the seat ring further defines a ring bore which is positioned concentrically with the flow opening and has an inner diameter; and the sealing and bearing discs are sized and configured to abut the inner diameter of the ring bore.

6. The plug and seal assembly of claim 1 wherein:

the seat ring further defines an inner cylindrical surface; and the plug head further defines a lower cylindrical section extending from the third ramp and being of a diameter smaller that that of the inner cylindrical surface.

7. The plug and seal assembly of claim 1 wherein the bearing discs are formed of metal.

8. The plug and seal assembly of claim 7 wherein the metal is stainless steel.

9. The plug and seal assembly of claim 1 wherein the sealing discs are formed of an elastomeric material.

10. The plug and seal assembly of claim 9 wherein the elastomeric material is carbon-fiber/nitrile sheets.

11. A plug and seal assembly for a fluid control valve, the fluid control valve having a valve housing defining an interior chamber and a flow opening fluidly communicating with the interior chamber and allowing fluid to escape the interior chamber, the assembly comprising:

a seat ring engaged to the valve housing at the flow opening and including first, second, and third annular sealing plates disposed above respective first, second and third annular resilient bearing plates, the first sealing plate defining an inner first cylindrical surface, the first and second bearing plates and the second sealing plate collectively defining a second inner cylindrical surface of a diameter smaller than that of the first cylindrical surface, the third sealing and bearing plates and the upper portion of the seat ring collectively defining a truncated conical sealing surface extending from the second cylindrical surface; and a plug head axially slidable within the interior chamber and defining a first taper and a second taper disposed below and abutting the first taper, the first and second tapers being sized and configured such that the direct engagement of the first taper to the first bearing plate creates a fluid-tight edge-to-surface seal, with simultaneous engagement of the second taper to the conical sealing surface creating a fluid-tight surface-to-surface seal for blocking the flow of fluid out of the interior chamber.

12. The plug and seal assembly of claim 11 wherein the plug head further defines:

an upper barrel sized such that an annular gap is created between the upper barrel and the first cylindrical surface during direct engagement of the first taper to the first bearing plate; and an intermediate barrel disposed between the first taper and the second taper and having a diameter substantially equal to that of the second cylindrical surface.

13. The plug and seal assembly of claim 12, wherein the fluid control valve further comprises a cylindrical plug body and:

the seat ring has an annular configuration;

the plug head has a cylindrical configuration and is affixed to the plug body;

the upper barrel has a cylindrical configuration and is sized to be complementary to the plug head; and the intermediate barrel has a cylindrical configuration and is sized to be complementary to the second cylindrical surface.

14. The plug and seal assembly of claim 11 wherein:

the seat ring further defines an annular ring bore which is positioned concentrically with the flow opening and has an inner diameter; and the sealing and bearing plates are sized and configured to abut the inner diameter of the ring bore.

15. The plug and seal assembly of claim 11 wherein:

the scat ring defines a vertical axis; and the conical sealing surface and the second taper are formed at complementary half-angles relative the vertical axis.

16. The plug and valve assembly of claim 15 wherein:

the half-angle of the first taper is approximately forty-five degrees; and the half-angle of the conical sealing surface and the second taper is approximately twenty degrees.

17. The plug and seal assembly of claim 11 wherein the conical sealing surface and the second taper are formed at unequal half-angles such that the fluid-tight seal defines an edge-to-surface seal.

18. The plug and seal assembly of claim 11 wherein the bearing plates are formed of metal.

19. The plug and seal assembly of claim 18 wherein the bearing plates are formed of stainless steel.

20. The plug and seal assembly of claim 11 wherein the sealing plates are formed of elastomeric material.

21. The plug and seal assembly of claim 20 wherein the elastomeric material is carbon-fiber/nitrile sheets.

\* \* \* \* \*